(12) United States Patent
Lin

(10) Patent No.: US 6,247,761 B1
(45) Date of Patent: Jun. 19, 2001

(54) STEPPING ROD ASSEMBLY FOR THE REAR AXLE OF A BICYCLE

(75) Inventor: Sonny Lin, Changhua (TW)

(73) Assignee: Den Liang Industrial Co., Ltd., Changhua Hsien (TW)

(*) Notice: Subject to any disclaimer, the term of this patent is extended or adjusted under 35 U.S.C. 154(b) by 0 days.

(21) Appl. No.: 09/480,681

(22) Filed: Jan. 11, 2000

(51) Int. Cl.$^7$ .................................................. B60B 35/00
(52) U.S. Cl. .................................. 301/124.1; 301/110.5
(58) Field of Search .......................... 301/6.1, 105.1, 301/110.5, 124.1, 126, 131; 280/165, 291

(56) References Cited

U.S. PATENT DOCUMENTS

| | | | |
|---|---|---|---|
| 615,533 | * | 12/1898 | Demory . |
| 618,855 | * | 2/1899 | Ennis et al. . |
| 625,368 | * | 5/1899 | Thompson . |
| 3,734,534 | * | 5/1973 | Brooks, Jr. et al. ................. 280/165 |
| 5,884,983 | * | 3/1999 | Wu ....................................... 301/124.1 |

* cited by examiner

Primary Examiner—Russell D. Stormer
(74) Attorney, Agent, or Firm—Bacon & Thomas, PLLC

(57) ABSTRACT

An improved stepping rod normally mounted to the rear axle of a bicycle has one end provided with a multi-angled countersunk cavity in correspondence to a locking nut secured to each end of the axle of a rear wheel of a bicycle and an extra locking nut is placed in a hollow interior of the stepping rod to lock the stepping rod firmly in place so that the stepping rod will not rotate when a person steps thereon and the locking nuts will not loosen during in use. Moreover, the stepping rod can be easily and quickly removed from and mounted to the axle of a rear wheel of a bicycle without affecting the original bicycle structure.

1 Claim, 3 Drawing Sheets

STEPPING ROD ASSEMBLY FOR THE REAR AXLE OF A BICYCLE

The present invention relates to an improved stepping rod mainly mounted to axle of a rear wheel of a bicycle. The stepping rod has one end provided with a multi-angled countersunk cavity in correspondence to a locking nut secured to each end of the axle of a rear wheel of a bicycle and an extra locking nut is placed in a hollow interior of the stepping rod to lock the stepping rod firmly in place so that the stepping rod will not rotate when a person steps thereon and the locking nuts will not loosen during in use. Moreover, the stepping rod can be easily and quickly removed from and mounted to the axle of a rear wheel of a bicycle without affecting the original bicycle structure at all.

Referring to FIG. 1, a conventional stepping rod 20 is mounted to each end of an externally threaded axle 12 of a rear wheel 10 of bicycle. The stepping rod 20 is mounted to the threaded axle 12 which is led through a fork tube 11 of the bicycle. The stepping rod 20 has an abutment end 21 provided with a central through hole 22 and an open-ended hollow interior 23. A washer 13 is first attached to the axle 12 and then a nut 14 is secured in place to each end of the threaded axle 12 so as to lock the transmission wheels and chain of a bicycle to the rear wheel of a bicycle.

In maintaining the conventional stepping rod 20 mounted to the threaded axle 12 of a rear wheel 10 of a bicycle, as seen in FIG. 2, the nut 14 is first removed from the threaded axle 12 of the rear wheel 10 and then the stepping rod 20 is engaged with the threaded axle 12 by guiding the same via the central hole 22 of the stepping rod 20. Next the nut 14 is placed into the stepping rod 20 via the open-ended hollow interior 23 and locked again to each end of the threaded axle 12 of the rear wheel 10 to complete the assembly.

Such a prior art stepping rod has the following disadvantages:
1. The nuts 14 must first be removed from ends of the threaded axle 12, then the stepping rod 20 is attached to the axle 12 by way of the removed nuts 14. The removal of the nuts 14 will cause the transmission wheels and chain to become loose and shifted from their original position. That will result in dangerous accidents if no proper adjustments are made on the shifted transmission wheels and chain, and the dismantling and re-mounting of the nuts are time consuming and inconvenient.
2. The nuts 14 originally dismantled from the axle 12 and then re-secured to the axle 12 placed into the stepping rod 20 via the open-ended hollow interior 23 after the stepping rod 20 is mounted to the axle 12 are easily loosened as a result of the stepping rod 20 being constantly spun by people stepping on the same.
3. The stepping rod 20 secured to the axle 12 by the nuts 14 is easily dismantled and will fall off when the nuts are loosened. That may cause traffic accidents.
4. When the stepping rod 20 is removed from the axle 12, the nuts 14 have to be dismantled from and secured to the axle 12 again. The transmission wheels and chain of a bicycle are easily shifted from position during this procedure.

SUMMARY OF THE INVENTION

Therefore, the primary object of the present invention is to provide an improved stepping rod which is a hollow tube having an abutment face at one end and a hollow interior at the other end so that the stepping rod can be directly mounted to the axle of a bicycle with a locking nut placed into the hollow interior of the stepping rod and locked in place on the threaded end of the axle and without dismantling any parts of a bicycle so that it is easy and safe to get the stepping rod mounted to the axle with less time. Thus, the transmission wheels and chain of a bicycle will not be influenced at all in the mounting of a stepping rod so that they will not be loosened.

Another object of the present invention is to provide an improved stepping rod which is easily and quickly mounted to each threaded end of an axle of a rear wheel without dismantling any fixed parts of a bicycle whereby less time is taken in the mounting of the stepping rod of the present invention.

One further object of the present invention is to provide an improved stepping rod provided with a hexagon-shaped or multi-angled countersunk cavity at one abutment end thereof which is engaged with a retaining nut secured to the threaded end of an axle so as to prevent the stepping rod mounted to the axle of a rear wheel and the locking nut from rotating and loosening up during use.

One further object of the present invention is to provide an improved stepping rod which can be dismantled from the axle of a rear wheel of a bicycle by simple removal of a locking nut housed in a stepping rod without affecting any nuts originally secured to the axle of a rear wheel whereby the transmission wheels and chain associated with the axle of the rear of a bicycle will not be influenced thus, preventing any danger produced as a result of dismantling of the stepping rods.

DETAILED DESCRIPTION OF THE PREFERRED EMBODIMENT

Figure 3:
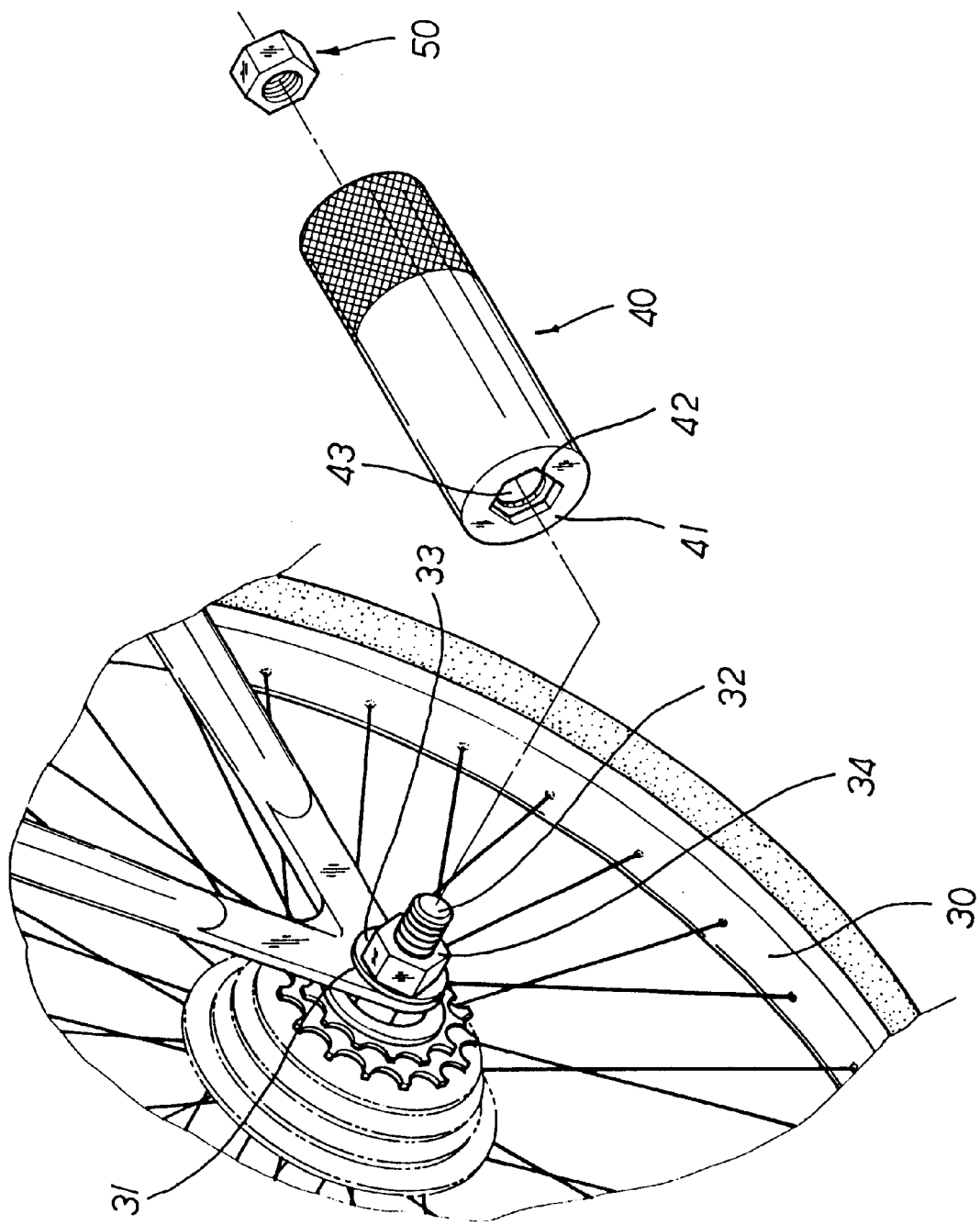
FIG 3 is a perspective diagram showing the exploded components thereof of the invention.

Referring to FIG. 3, a perspective diagram showing the exploded components of the present invention. A stepping rod 40 is removably secured to a central axle 32 of a rear wheel 30. The central axle 32 passing through the fork tubes 31 of a bicycle has a threaded extension at each end and a washer 33 is mounted to the threaded end of the axle 32 and fixed in place by a nut 34. Thus, the transmission wheels and chain of a bicycle can be fixed in place. Each of the rear stepping rods 40 is a hollow cylindrical tube and has a supporting end 41 which is provided with a hexagonal or multi-angled countersunk cavity 42 defined in correspondence to the size and configuration of the nut 34 and having a through hole 43 at an abutment end 41. The stepping rod 40 has a hollow interior 44 at the other open end thereof.

Figure 1:
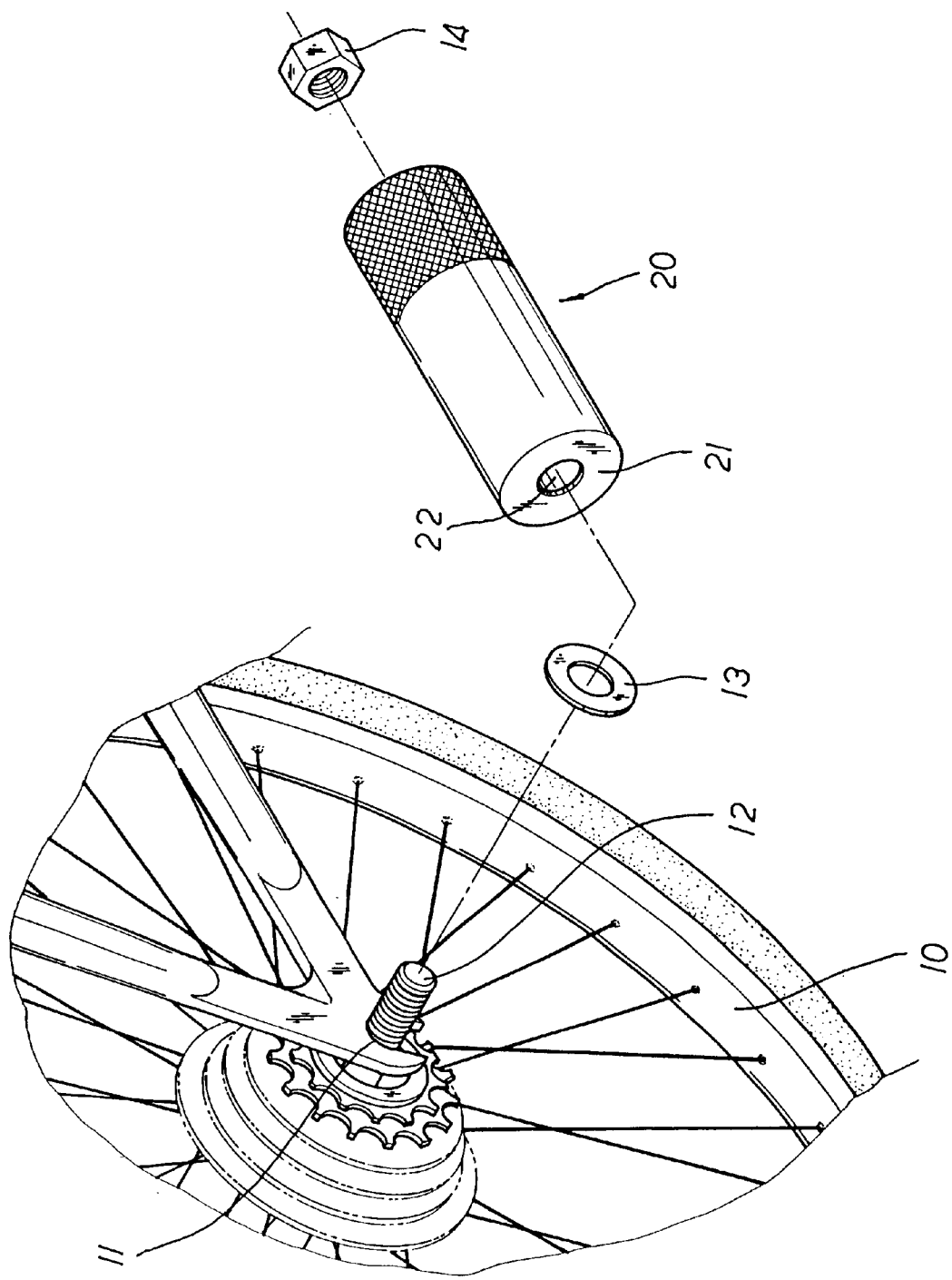
FIG. 1 is a perspective diagram showing the exploded components of a prior art stepping rod.
Figure 2:
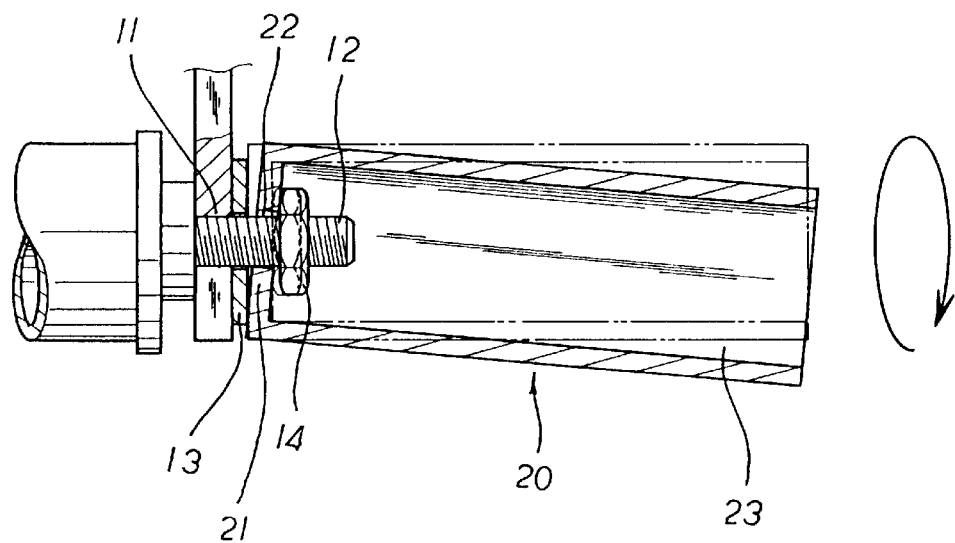
FIG. 2 is a sectional diagram showing the bending of a prior art stepping rod and loosening of a nut during use.
Figure 4:
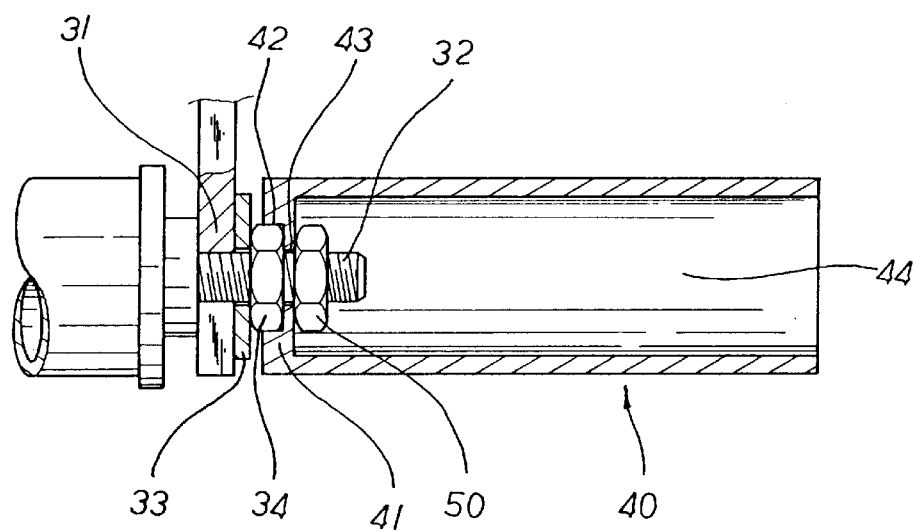
FIG 4 is a sectional diagram of the present invention.

Referring to FIG. 4, to get the stepping rod 40 mounted onto the extended axle 32 of a bicycle, the threaded end of axle 32 is led to pass the through hole 43 of the stepping rod 40 to engage with the nut 34 fixed to the axle 32 of a rear wheel 30 of a bicycle. Then, the stepping rod 40 is restrained from rotation by the nut 34. Next, a locking nut 50 is placed from the other opened end of the stepping rod 40 into the hollow interior 44 and secured in place to the threaded end of axle 32 of the rear wheel 30 so that the stepping rod 40 becomes integral with the rear axle 32.

By way of the above described structure, there are following advantages obtained.

1. The stepping rod 40 is secured to the axle 32 of a rear wheel 30 by the locking nut 50 which is placed into the stepping rod 40 from the hollow interior 44 and fixed to the axle 32 without loosening up the nut 34 of a bicycle so that the transmission wheels and chain of a bicycle can be prevented from disengagement in the mounting process, thus preventing danger in driving of a bicycle.

2. It takes less time to mount the stepping rod 40 to the axle 32 of a rear wheel 30 because the nut 34 of the axle 32 of a rear wheel 30 is not required to be dismantled during mounting of the stepping rod 40.

3. The hexagonal or multi-angled cavity 42 at one end of the stepping rod 40 is firmly engaged with the nut 34 of rear wheel 30 so that the stepping rod 40 is effectively restrained from loosening during use.

4. It is easy and takes less time to dismantle the stepping rod 40 in a reverse procedure from the axle 32 by removal of the locking nut 50 without loosening up the nut 34 so that the transmission wheels and chain of the bicycle can be protected from disassembly during use.

I claim:

1. A stepping rod assembly mountable to either threaded end of a bicycle axle that is already provided with an existing nut threadedly engaged on each threaded end for securing the fork tubes, transmission wheels and chain of the bicycle together, which rod assembly comprises:

a stepping rod in the form of a hollow cylinder having an interior, an abutment end and an open end, a multi-angled countersunk cavity formed in the abutment end, the cavity having a size and configuration conforming to the size and configuration of the existing nut for receiving same therein, a through hole formed in the cavity for receiving a threaded end of the axle and disposing same within the interior of the cylinder when the existing nut is received within the cavity, and a locking nut for threaded engagement onto the threaded end of the axle within the interior of the cylinder to secure the cylinder onto the axle without requiring removal of the existing nut.

* * * * *